Aug. 3, 1965         J. M. STOLARCZYK         3,198,572
SEALING ARRANGEMENT FOR VEHICLE BODY CLOSURE STRUCTURES
Filed March 11, 1963                    3 Sheets-Sheet 1
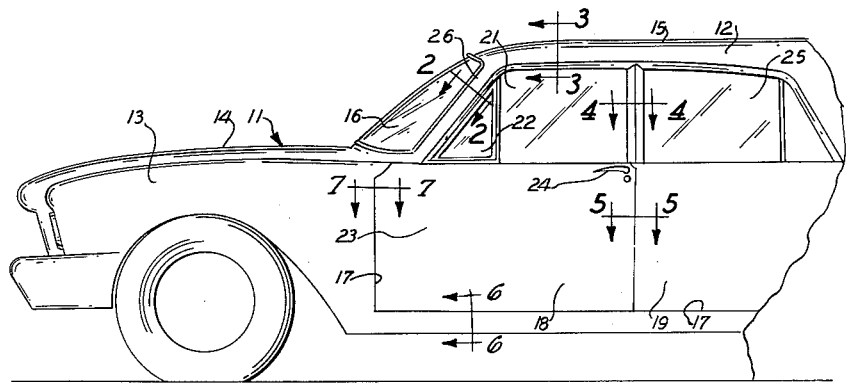
FIG. 1
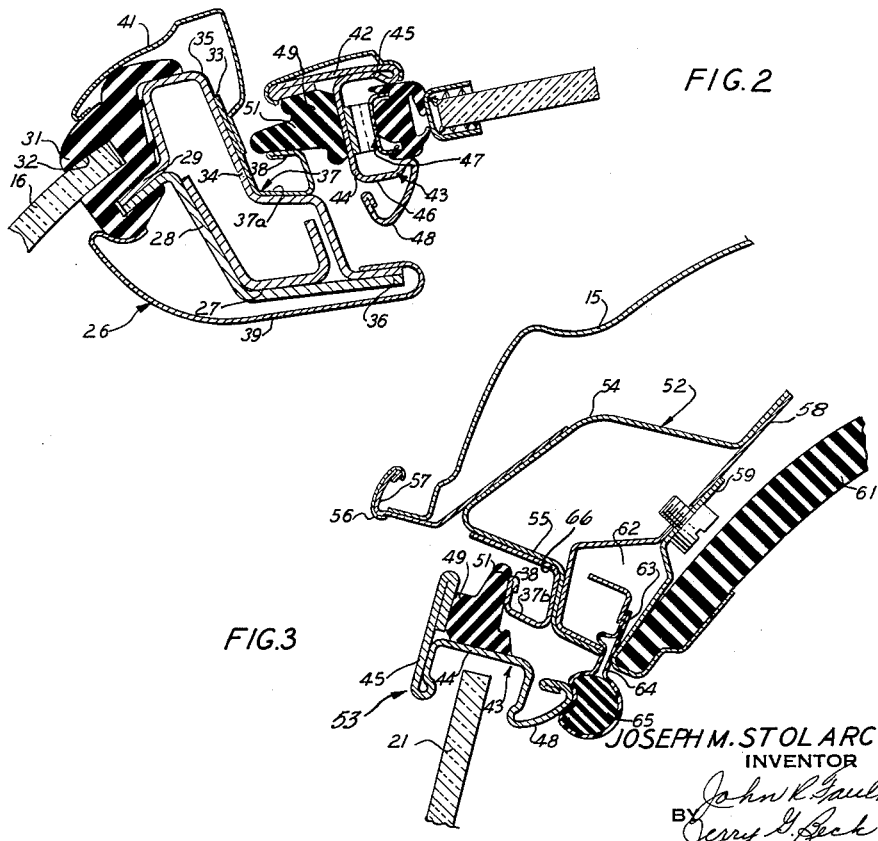
FIG. 2
FIG. 3
JOSEPH M. STOLARCZYK
INVENTOR
ATTORNEYS

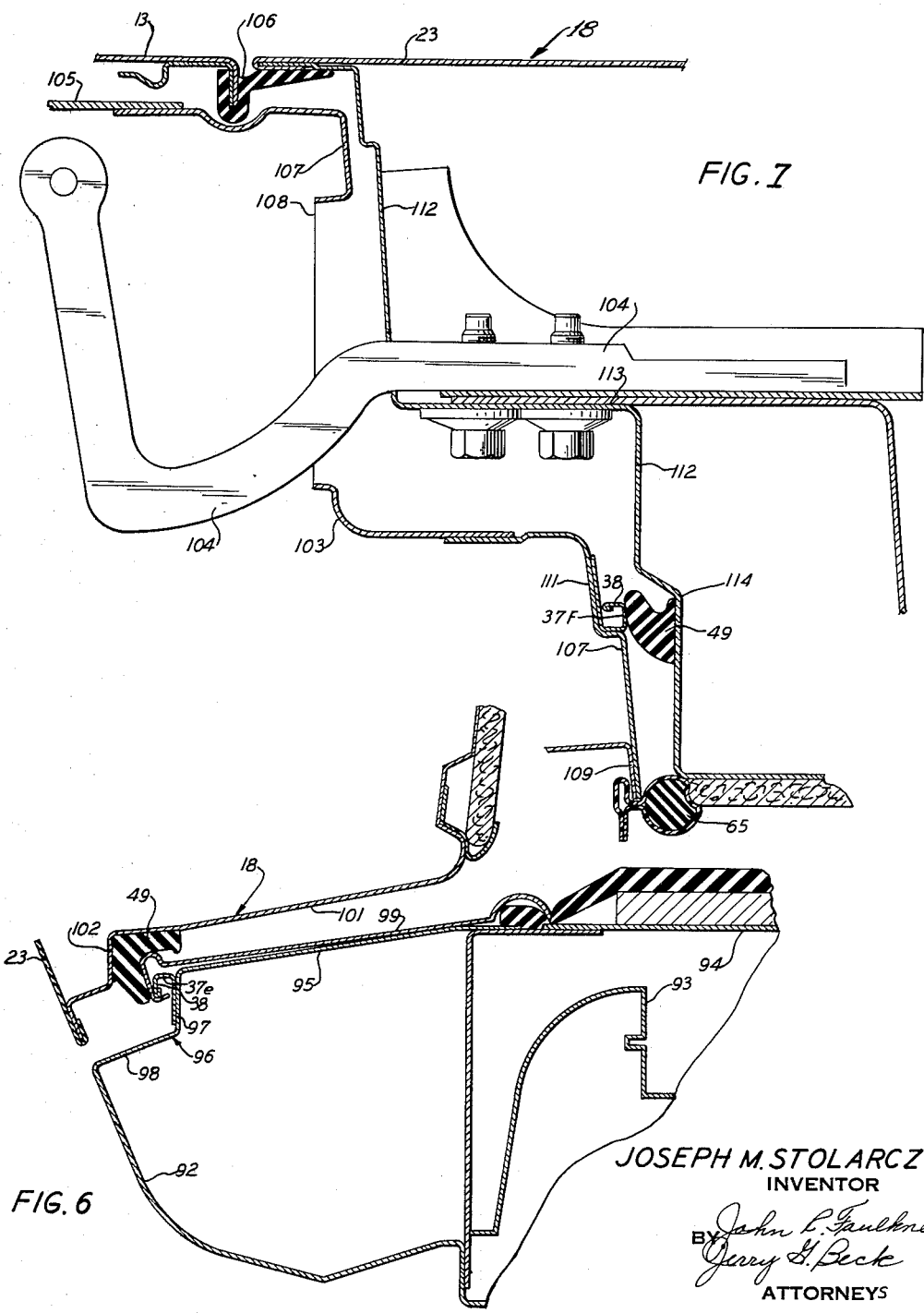

United States Patent Office 3,198,572
Patented Aug. 3, 1965

3,198,572
SEALING ARRANGEMENT FOR VEHICLE BODY
CLOSURE STRUCTURES
Joseph M. Stolarczyk, Wyandotte, Mich., assignor to Ford
Motor Company, Dearborn, Mich., a corporation of
Delaware
Filed Mar. 11, 1963, Ser. No. 264,231
11 Claims. (Cl. 296—28)

This invention relates generally to vehicle body construction and more specifically to a sealing arrangement for closure structures of motor vehicle bodies.

It is the current practice in motor vehicle construction to provide a drip molding along the body header structure supporting the roof of the vehicle. This drip molding projects outwardly from the body to partially overlap the space between the header structure of the door and the superimposed body header structure. A weather strip is attached to the entire periphery of the door inwardly from its exterior panel so that it sealingly engages a portion of the body surfaces defining the body opening for the door.

When the vehicle is moving at high speeds, rain water may be driven by the wind into the space between the door and the vehicle body structure. This may result in water settling on the peripheral surfaces of the door inward of the sealing strip, either due to capillary action caused by the difference in pressure inside and outside of the vehicle body or due to defects in the weather strip itself. The water accumulated on these peripheral surfaces may be "dumped" onto the occupant of the vehicle, especially when he opens the door to enter or leave the passenger compartment.

The vehicle body construction of this invention, which is designed to remedy this disadvantage, generally includes a vehicle body wall that is provided with at least one body opening encompassed by structural members.

A closure structure, such as a vehicle door, has a continuous weather strip attached to its periphery. This door is mounted in the body opening and adapted for swinging movement between opened and closed positions. A continuous offset is provided in all surfaces of the body structural member which define the body opening for the door. A continuous gutter is mounted in this offset. When the closure structure is in a closed position, the weather strip around the periphery of the door engages the gutter to seal the body opening. The gutter will intercept any water which may enter the body opening when the door is closed and drain this water along the continuously extending gutter to the exterior of the vehicle body without permitting its accumulation on the surfaces of the body structural members or on the periphery of the door.

The primary object of this invention is to provide an improved means for sealing the opening between the closure structure and the vehicle body structural members.

Another object of this invention is to provide a continuous gutter around the entire door opening of the vehicle body which will intercept any water that may enter the door opening when the door is in a closed position and drain this intercepted water to the exterior of the vehicle body.

Other objects, advantages and features of the present invention will be made more apparent as this description proceeds, particularly when considered in connection with the accompanying drawings, in which:

FIGURE 1 is a partial side view of an automotive vehicle;

FIGURE 2 is a sectional view taken along line 2—2 of FIGURE 1 depicting a typical section through a windshield pillar incorporating the structure of this invention;

FIGURE 3 is a sectional view taken along line 3—3 of FIGURE 1 depicting a section taken through a body header incorporating the structure of this invention;

FIGURE 6 is a sectional view taken along line 6—6 of FIGURE 1 showing a section through the base sill structure of a vehicle body incorporating the structure of this invention; and, FIGURE 7 is a sectional view taken along line 7—7 of FIGURE 1 showing a section through a front door pillar incorporating the structure of this invention.

Figures 4, 5:
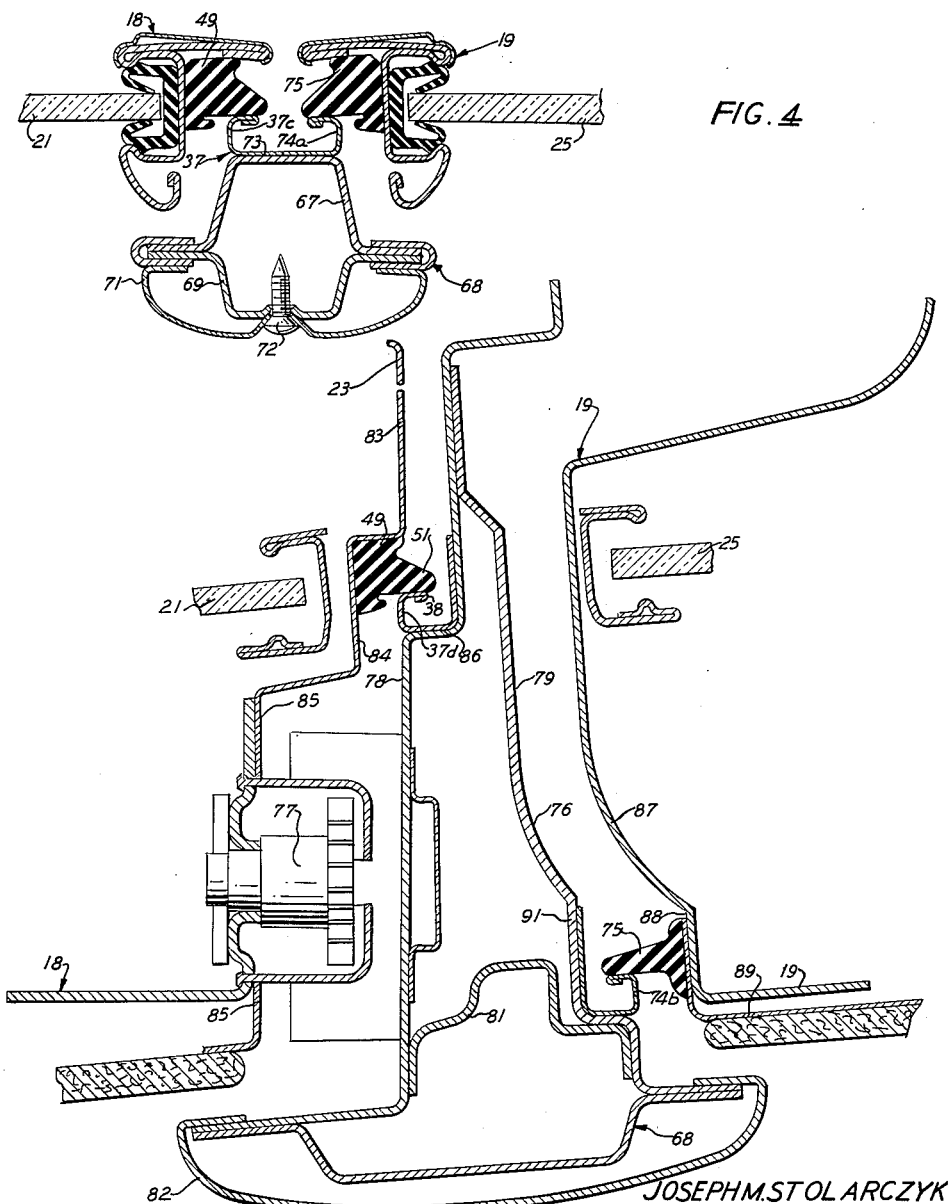
FIGURE 4 is a sectional view taken along line 4—4 of FIGURE 1 showing a section through the upper portion of a center door pillar incorporating the structure of this invention.
FIGURE 5 is a partial sectional view taken along line 5—5 of FIGURE 1 showing the lower portion of a door pillar incorporating the construction of this invention.

Referring now to the drawings, especially FIGURE 1, there can be seen a partial side view of a motor vehicle 11 including a vehicle body 12 having a front fender 13, a hood 14, a roof panel 15, and a windshield 16. The vehicle body 12 is provided with door openings 17. Closure structures, such as a front door 18 and a rear door 19, are mounted in each opening 17 for swinging movement between opened and closed positions but are depicted in FIGURES 1 through 7 in their closed positions. The front door 18 is provided with a side window 21, a vent window 22, an exterior panel 23, and a door handle 24. The rear door 19 is shown having a slidable side window 25.

To illustrate the vehicle body construction of this invention, six sectional views are presented with each figure depicting a typical section through one of the body structural members encompassing the door opening 17 in which the front door 18 is swingably mounted. In FIGURE 1 is seen the left side of a motor vehicle. Sectional views 2, 4, 5 and 7 depict corresponding positions through the right side of the vehicle.

A sectional view through a windshield pillar 26 is shown in FIGURE 2. The windshield pillar, generally designated 26, comprises a hollow structural member 27 fabricated of special channel sections welded together to form a reinforced box section. The hollow structural member 27 has a forward facing surface 28 provided with a pinch weld flange 29 to which a weather strip 31 is securely attached. This weather strip 31 has a recess 32 which receives the side edge of the windshield 16. Hollow structural member 27 also has a rearwardly facing surface 33 which is provided with an offset 34 that begins at the rear outer edge 35 of the hollow structural member 27 and extends inwardly towards its rear inwardly extending flange 36.

A continuous gutter, generally designted 37, has one section 37a thereof welded or otherwise secured to the hollow structural member 27 and positioned within the offset 34. The gutter 37 is provided with a longitudinally, forwardly extending flange portion 38.

The hollow structural member 27 may be decoratively trimmed by an interior molding strip 39 and an exterior molding strip 41 which has one end clamped to the windshield weather strip 31 and its other end in abutment with the base portion of the gutter 37.

A front door pillar 42 adjacent the vent window 22 is received in the offset 34 so that it is in a contiguous and complementary relationship therewith when the front door 18 is in a closed position. The front door pillar 42 comprises a channel 43 having a base 44 and two sides 45 and 46. The weather strip assembly 47, which makes contact with the closed vent window 22, is housed within the channel 43. The outwardly facing side 45 of the channel 43 has a closely returned bent portion that extends forward and beyond the base 44 while the other side 46 has a returned curved portion to form a drip flange 48.

A continuous door weather strip 49 is attached to the closely returned bent portion of one side 45 and the base 44 of the channel 43 rearward of the windshield pillar 26. The weather strip 49 is molded with a continuous sealing flap portion 51 which engages the flange portion 38 of the gutter 37 when the front door 18 is closed. Water entering the space between the offset 34 and the front door pillar 42 will be prevented from entering the vehicle body 12 by the weather strip 49 and the gutter 37 which will also intercept the water and drain it downwardly to the exterior of the vehicle 11.

Referring now to FIGURE 3, there is shown a sectional view through a body header structure 52 and a juxta-positioned upper door header structure 53.

The door header structure 53 comprises a continuation of channel 43 which now has its opening facing in a downward direction in order to receive the upper edge of sliding side window 21. A corresponding continuation of the weather strip 49 is attached to the upper surface of channel 43 and positioned between the closely returned bent portion of the side 45 and the base 44 of the channel 43.

The body header structure 52 above the front door 18 has a box rail section 54 and a base portion 55. The box which rail section 54 has an outwardly projecting flange 56 which is bent upwardly to form a drip molding 57. The inwardly facing surface 58 of the rail section 54 supports a headliner support member 59 carrying a headliner 61 which covers the interior surface of the roof panel 15. A recess portion 62 intermediate the headliner support member 59 and the rail section 54 has an opening 63 through which a clip 64 extends. This clip 64 supports an interior windlace 65 which engages the drip flange 48 when the door 18 is in a closed position.

The base portion 55 is provided with an offset 66 which extends downwardly and then inwardly to connect with the recess portion 62. Gutter section 37b is disposed within this offset 66 and secured to the base portion 55 of the body header structure 52. The flange portion 38 of the gutter 37b is engaged by the sealing flap portion 51 of the weather strip 49 when the front door 18 is in a closed position as seen in FIGURE 3.

In FIGURE 4 is seen a sectional view through an upper portion 67 of the center door pillar 68 which is disposed intermediate the front door 18 and the rear door 19 of the vehicle 11. The inwardly facing surface 69 of the upper portion 67 is trimmed by an interior molding strip 71 secured thereto by screw 72. Gutter section 37c is attached to the outwardly facing surface 73 of the upper portion 67 and is juxtapositioned to a gutter section 74a of similar design. Both gutter sections 37c and 74a are positioned so as to assume one channel-shaped configuration and thus may be readily integrally formed for the segment which is attached to the upper portion 67 of the center door pillar 68.

The rear door 19 is provided with a weather strip 75 which is mounted in the same fashion as the weather strip 49 around the front door 18 as seen in FIGURE 2. Each weather strip 49 and 75 engages gutter 37c and 74a, respectively, to provide a seal against dirt, dust and water between the front door 18 and the rear door 19 in the immediate vicinity of the upper portion 67 of the center door pillar 68. Any water draining into the space between the weather strips 49 and 75 will be intercepted by the gutters 37c and 74a and drain downwardly therein to the exterior of the vehicle 11.

In FIGURE 5 can be seen a partial sectional view taken through a lower portion 76 of the center door pillar 68 above a conventional door lock mechanism 77 installed in the front door 18.

The depth of the center door pillar 68 is substantially extended at its lower portion 76 so that the convergent forwardly facing surface 78 and rearwardly facing surface 79 require a cross brace 81 to effect a rigid door pillar structure. The lower portion 76 of the center door pillar 68 is trimmed with a wide, decorative trim molding strip 82 on its interior facing surface.

The front door 18 has a peripheral portion 83 which extends inwardly from its exterior panel 23. The panel 23 in FIGURE 5 is shown displaced inwardly from its true position. This peripheral portion 83 is provided with a first stepped portion 84 inward of the exterior panel 23. A second stepped portion 85 is provided inwardly spaced from the first stepped portion 84 within which the door lock mechanism 77 is housed. The weather strip 49, which extends around the entire periphery of the door 18, is disposed in the first stepped portion 84 and secured thereto. The sealing flap portion 51 of the weather strip 49 extends into the door opening 17. The forward facing surface 78 of the lower portion 76 of the center door pillar 68 is provided with an offset 86 which is in a longitudinal and complementary spaced relationship with the second stepped portion 85 when the front door 18 is in a closed position as seen in FIGURE 5.

Gutter section 37d splits away from gutter 74a and then continues downwardly in offset 86. The sealing flap portion 51 engages the flange portion 38 of the gutter 37d to seal the door opening 17 to prevent dust and water from entering the vehicle body 12 and settling on the door lock mechanism 77.

The rear door 19 also has a peripheral portion 87 which is provided with a stepped portion 88 adjacent its inner panel 89. Weather stripping 75 is positioned in this stepped portion 88 of the rear door 19. An offset 91 is formed in the rearwardly facing surface 79 of the lower portion 76 of the center door pillar 68 adjacent this cross brace 81. Gutter section 74b, after it splits away from gutter 37c, is disposed within this offset 91. The engagement of the weather strip 75 with the gutter 74b provides a seal between the lower portion 76 and the rear door 19. The gutter 74b will intercept any water entering the space between the rear door 19 and the rearwardly facing surface 79 of the center pillar 68 and drain it to the exterior of the vehicle 11.

As seen in FIGURE 6, the bottom of the vehicle body 12 is constructed to form a base sill structure 92 extending outwardly from the body rail structure 93 and floor board 94. The top wall 95 of the base sill structure 92 extends outwardly as a continuation of the floor board 94. This top wall 95 is formed with an offset 96 defined by a downwardly extending portion 97 and a diagonally outwardly and downwardly extending portion 98. Gutter section 37e is positioned in this offset 96 and secured to the downwardly extending portion 97 so that the flange portion 38 of the gutter 37e extends in a downward direction.

A floor molding strip 99 has one end attached to the flange portion 38 of the gutter section 37e and its other end attached to the floor board 94 thereby covering the entire top wall 95. The front door 18 has a bottom peripheral portion 101 which extends inwardly from its exterior panel 23. This peripheral portion 101 is formed with a stepped portion 102 which is in a spaced, generally vertical relationship with the offset 96 when the front door 18 is in a closed position. The weather strip 49 is positioned in this stepped portion 102 and attached thereto in a similar fashion as at the other peripheral portions of the front door 18. The edge portion of the floor molding strip 99 at the gutter section 37e engages the weather strip 49 to provide a seal which prevents dirt, dust and water from being blown into the vehicle body 12 through the space defined by the floor molding strip 99 and the bottom peripheral portion 101 of the front door 18. Any water which may enter this space will be intercepted by the continuous gutter section 37e which is facing downwardly in this segment and will flow along the diagonally outwardly and downwardly extending portion 97 to the exterior of the vehicle body 12.

FIGURE 7 depicts a sectional view taken through a front door pillar 103 at its upper hinge 104.

The front fender 13, which covers the outwardly facing surface 105 of the front door pillar 103, is provided with a sealing strip 106 which abuts the exterior panel 23 of the front door 18 when the latter is closed. The front door pillar 103 has a rearwardly facing surface 107 extending inwardly from the outwardly facing surface 105. An opening 108 is cut into the rearwardly facing surface 107 to provide clearance for the upper hinge 104. From the opening 108 the rearwardly facing surface 107 continues to extend longitudinally rearwardly before being bent approximately 90° to connect with an inwardly extending flange portion 109. The rearwardly extending surface 107 has a stepped portion 111 intermediate the 90° bend and the flange portion 109. Gutter section 37f is positioned in the stepped portion 111 and secured to the front door pillar 103.

The front door 18 has a side peripheral portion 112 which extends inwardly from the exterior panel 23. The side peripheral portion 112 has an offset portion 113 to follow the 90° bend of the rearwardly facing surface 107 of the front door pillar 103. The hinge 104 is secured to the front door 18 in this offset portion 113. Weather strip 49 is attached in a stepped portion 114 of the front door 18 inward of the offset portion 113. The sealing flap portion 51 of the weather strip 49 engages the flange portion 38 of the gutter section 37f when the door 18 is in a closed position.

It can be seen from FIGURES 2 through 7 that the body structural members of the vehicle body construction 12 of this invention have surfaces extending inwardly from the exterior panels of the vehicle body 12 to define door openings 17 in which either the front door 18 or the rear door 19 is mounted. These inwardly extending surfaces defining the body openings 17 are provided with a series of aligned offsets which do not interfere with the swinging movement of the door 18. The continuously extending gutter 37 is positioned in these offsets to encompass the entire door opening 17. This gutter 37 is formed with a flange portion 38 which extends inwardly into the door opening 17. The front door 18 is provided with a continuous weather strip 49 which is mounted inwardly of its exterior panel 23 on the peripheral surfaces of the door 18 or attached to the channel 43 defining in part the periphery of the door 18. The weather strip 49 is located so that it is in a contiguous, spaced relationship with the gutter 37 when the door 18 is in a closed position.

The sealing flap portion 51 of the weather strip 49 extends into the opening 17 to engage the flange portion 38 of the gutter 37 to provide a tight seal around each door 18 and 19 when the doors are in closed positions to prevent dirt, dust and water from entering the vehicle body 12. Any water which may enter this space between the peripheral portion of the doors 18 and 19 and the inwardly extending surfaces of the structural members defining the body opening 17 will be intercepted by the gutter 37. The water will drain downwardly in the gutter 37 to the base sill structure 92. Then it will continue to drain outwardly along the diagonally outwardly and downwardly extending portion 97 of the base sill structure 92 to the exterior of the vehicle 11.

It will be understood that this invention is not to be limited to the exact construction shown and described but that various changes and modifications may be made without departing from the spirit and scope of the invention as defined in the appended claims.

I claim:

1. In a vehicle body, a body wall having an exterior panel and an interior panel, an opening extending through said panels encompassed by structural members, a closure structure mounted on one of said structural members for swinging movement between closed and opened positions, continuous sealing means attached to the periphery of said closure structure, a stepped portion formed in the surfaces of said body structural members intermediate said exterior and interior panels, a continuous gutter encompassing said opening and secured to said stepped portion, said sealing means engaging said gutter in a closed position of said closure structure to seal said body opening, said gutter being adapted to intercept any water entering said body opening when said closure structure is in a closed position and to drain said intercepted water to the exterior of the vehicle body.

2. In a vehicle body construction, a vertical body wall having an exterior panel, a body opening in said body wall defined by surfaces of body structural members extending inwardly from the exterior panel, a closure structure mounted on one of said body structural members for swinging movement between closed and opened positions, weather stripping secured to the periphery of said closure structure, a stepped portion in said inwardly extending surfaces of the body structural members inwardly spaced from said exterior panel, a gutter encompassing said body opening and secured to said stepped portion, said gutter having a continuous flange portion extending from said stepped portion into said body opening, said weather stripping engaging said flange portion of the gutter in a closed position of said closure structure to seal said body opening, said gutter intercepting any water entering the space between the inwardly extending surfaces of said body structural members and the periphery of said closure structure when the latter is in said closed position.

3. In a vehicle body construction, a vertical body wall having an exterior and an interior panel, said body wall provided with a body opening defined by body structural members having surfaces extending inwardly from the exterior panel of said body wall, a closure structure mounted on one of said structural members for swinging movement between closed and opened positions, said closure structure having an exterior panel and a peripheral surface extending normally therefrom, said exterior panel of the closure structure being in a plane substantially coincident with the plane of the exterior panel of said body wall when said closure structure is in a closed position, a stepped portion in said inwardly extending surfaces of the body structural members and spaced inwardly from said body wall exterior panel, a continuous gutter encompassing said body opening and secured to said stepped portion, said gutter having a continuous flange portion extending from said stepped portion into said body opening, a sealing means secured to the peripheral surface of said closure structure and spaced inwardly from its exterior panel, said sealing means engaging said flange portion of the gutter to seal said body opening when said closure structure is in a closed position, said gutter intercepting any water entering the space between said peripheral surface of said closure structure and the inwardly extending surface of said body structural members when said closure structure is in a closed position, said gutter deflecting the intercepted water to the exterior of the vehicle body.

4. In a vehicle body construction, a vertical body wall provided with a body opening defined by a roof header structure, a pair of door pillars, and a base sill structure, a closure structure pivotally mounted on one of said door pillars for movement between closed and opened positions in said body opening, a weather stripping mounted on the periphery of said closure structure, a continuous stepped portion in those surfaces of said roof header structure, said pair of door pillars, and said base sill structure facing said body opening, a continuous gutter mounted in said stepped portion, said gutter having a flange portion extending into said body opening, said weather stripping abutting said flange portion when said closure structure is in a closed position to prevent the entry of dirt, dust and water into said vehicle body, said gutter intercepting any water which may enter said body opening when said closure structure is in a closed position and draining the water to the exterior of the vehicle body.

5. In a vehicle body construction, a vertical body wall provided with a body opening defined by a roof header structure, a pair of door pillars, and a base sill structure, a closure structure pivotally mounted from one of said door pillars for swinging movement between closed and opened positions, said closure structure having an exterior panel with a peripheral flange extending inwardly therefrom, an offset in said peripheral flange inwardly spaced from the exterior panel of said closure structure, said closure structure when in a closed position being in a plane substantially coincident with the plane of said body opening, a weather stripping mounted in said offset, said weather stripping having a sealing flap portion extending outwardly of said offset, a continuous stepped portion provided in said roof header structure, said pair of door pillars, and said base structure and spaced inwardly from the exterior surface of said vertical body wall, said stepped portion being in a spaced relationship with respect to said offset when said closure structure is in a closed position, a gutter secured to said stepped portion, said gutter having a flange portion extending into said body opening, said sealing flap portion of the weather stripping engaging the flange portion of said gutter when said closure structure is in a closed position to provide a seal for said body opening to prevent the entry of dirt, dust and water into said vehicle body, said gutter intercepting any water which may enter between said closure structure and the members defining said body opening when said closure structure is in a closed position and then draining said intercepted water to the exterior of the vehicle body.

6. In a vehicle body construction, in combination, a door mounted on said vehicle body for movement between closed and opened positions, a body header structure defining in part a door opening in said vehicle body, said body header structure having a roof panel extending upwardly from its exterior edge, said body header structure including a box section rail formed with a downwardly extending offset spaced inwardly from said exterior edge and outwardly from its interior edge, a drip molding integrally formed with the outwardly extending edge of said box section rail, a gutter attached to said box section rail and positioned within said offset, said door having a door header structure comprising a downwardly opening channel for receiving the upper edge of a slidable glass panel, a weather strip secured to said channel, said weather strip engaging said gutter when said door is in a closed position to provide a seal to prevent the entry of water into said vehicle body, said gutter intercepting any water which may enter the space between said body header structure and said door header structure when said door is in a closed position and draining said intercepted water to the exterior of the vehicle body.

7. In a vehicle body construction, in combination, a door mounted on said vehicle body for swinging movement between closed and opened positions, a body header structure defining in part a door opening in said vehicle body, said body header structure including a box section rail having a base portion and an outwardly extending flange, a recessed portion attached to the inwardly facing surface of said box section rail, said base portion being formed with a downwardly extending offset spaced inwardly from said flange and outwardly from said recessed portion, a drip molding integrally formed with the outwardly extending flange of said rail, a gutter attached to said base portion and positioned within said offset, said door having a door header structure comprising a downwardly opening channel for receiving the upper edge of the slidable glass panel, said channel having a base and an outwardly facing leg which has a portion projecting upwardly beyond the base of said channel, a weather strip secured to said channel and positioned in the angular section defined by said base and the upwardly extending leg portion of said channel, said weather strip engaging said gutter inwardly from said flange when said door is in a closed position to prevent the entry of dirt, dust and water into said vehicle body, said gutter intercepting any water entering portions of said door opening when said door is in a closed position and then draining said water to the exterior of the vehicle body.

8. In a vehicle body construction, in combination, a door mounted on said vehicle body for swinging movement between closed and opened positions, a roof panel, and a body header structure, said body header structure defining in part a door opening in said vehicle body, said door when in a closed position being coincident with the plane of said door opening, said body header structure including a box section rail having a base portion with a flange at its outwardly facing edge and a first weather stripping at its inwardly facing edge, said base portion being formed with a downwardly extending offset intermediate its edges, a drip molding integrally formed with the outwardly facing edge of said rail, said roof panel being attached to said drip molding, a gutter secured to said base portion of said section and disposed within said offset, said door including a door header structure comprising a downwardly opening channel for receiving the upper edge of a slidable glass panel, said channel having a base and an outwardly facing leg with a portion of said leg extending upwardly beyond the base of said channel, a second weather stripping secured to said channel and positioned in the angular section defined by the upwardly extending leg portion and the base of said channel, said second weather stripping having a sealing flap portion extending in a generally upward direction from said angular section into the door opening, said sealing flap portion engaging a portion of said gutter to provide a seal for the door opening when said door is in a closed position to prevent the entry of dirt, dust and water into the vehicle body, said gutter being disposed between said first and second weatherstripping when said door is in a closed position to intercept any water entering the space between said door header structure and said body header structure and to drain said intercepted water to the exterior of the vehicle body.

9. In a vehicle body construction, in combination, a center door pillar defining in part adjacent door openings in said vehicle body, a door mounted in each of said door openings for swinging movement between closed and opened positions, each door having an exterior panel and peripheral surfaces extending inwardly therefrom, the upper portion of said center door pillar being of a relatively thin cross section, the lower portion of said center door pillar having opposite surfaces with each surface being juxtapositioned to one peripheral surface of each door respectively when said doors are in closed positions, each surface of the lower portion of said center door pillar having a stepped portion extending in a vertical direction, a pair of gutters, one gutter having one segment secured to the outer facing surface of said upper portion of the center door pillar and another segment secured to the lower portion of the center pillar and positioned in said stepped portion of one of the surfaces thereof, the other gutter having one segment secured on the surface facing outwardly of said upper portion of the center door pillar and another segment secured to the lower portion of said center pillar and positioned in said stepped portion of the other of the surfaces, a weather strip mounted on the peripheral surfaces of each of said doors, the weather strip of each door engaging one of said gutters when said respective door is in a closed position to provide a seal to prevent the entry of dirt, dust and water into said vehicle body, said pair of gutters intercepting any water which may enter the space between said doors and said center door pillars and draining the intercepted water to the exterior of the vehicle body.

10. In a vehicle body construction, a pair of door openings in said vehicle body, a door mounted in each of said openings for swinging movement between closed and opened positions, an upper portion of a center door pillar defining in part a pair of adjacent door openings, a gutter attached to the outwardly facing surface of said upper portion of the center door pillar, said gutter having side walls extending outwardly from said outwardly facing surface, weather stripping mounted on the periphery of each of said pair of doors, said weather stripping having sealing flap portions extending into said door openings, said sealing flap portions engaging the edges of said side walls of the gutter when said pair of doors are in a closed position to provide a seal to prevent the entry of dust, dirt and water into said vehicle body, said gutter intercepting any water entering the space between said doors and said upper portion of said center door pillar when said door is in a closed position and then draining the water to the exterior of the vehicle body.

11. In a vehicle body construction, a door opening in a wall of said vehicle body, a door positioned in said door opening and mounted on said vehicle body for swinging movement between closed and opened positions, a base sill structure defining in part said door opening in said vehicle body, said door being provided with an exterior panel and a peripheral surface extending inwardly from said exterior panel, said base sill structure provided with a base portion, said base portion having a downwardly extending offset, a gutter mounted in said offset, said peripheral surface of said door provided with an offset in a spaced complementary relationship from said offset in the base sill structure when said door is in a closed position, a weather strip mounted in said offset of the peripheral surface of said door, said weather strip engaging said gutter when said door is in a closed position to provide a seal to prevent the entry of dirt, dust and water into said vehicle body, said gutter intercepting any water which may enter the space between said base sill structure and said peripheral surface of the door and deflecting the intercepted water to the exterior of the vehicle body.

References Cited by the Examiner

UNITED STATES PATENTS

| 2,361,610 | 10/44 | Doty et al. | 296—28 X |
| 2,456,175 | 12/48 | Coppock et al. | |
| 2,677,572 | 5/54 | Pickard | 296—28 |
| 2,733,096 | 1/56 | Waterhouse et al. | 298—28 |
| 2,826,447 | 3/58 | Renno | 296—28 |

FOREIGN PATENTS 491,306   8/38   Great Britain.

A. HARRY LEVY, *Primary Examiner.*